United States Patent

[11] 3,615,311

[72] Inventor Richard H. Ignatius
 Aiken, S.C.
[21] Appl. No. 875,842
[22] Filed Nov. 12, 1969
[45] Patented Oct. 26, 1971
[73] Assignee Owens-Corning Fiberglas Corporation
 Continuation-in-part of application Ser. No. 610,488, Jan. 20, 1967, now abandoned.

[54] STARCH COATED FIBERS HAVING IMPROVED DRYING CHARACTERISTICS
 9 Claims, 1 Drawing Fig.

[52] U.S. Cl................................................ 65/3,
 117/126 GQ, 106/210, 106/213, 117/46 CA, 117/66
[51] Int. Cl......................................................C03c 25/02, C08b 25/02
[50] Field of Search............................................ 117/126 GQ, 46 CA, 66; 106/210, 213; 260/233.3, 233.5; 65/3

[56] References Cited
UNITED STATES PATENTS

| | | | |
|---|---|---|---|
| 2,946,705 | 7/1960 | Olsen............................ | 117/126 GQ |
| 3,077,469 | 2/1963 | Aszalos......................... | 260/233.3 |
| 3,167,468 | 1/1965 | Lovelace et al................ | 117/126 GQ |
| 3,227,192 | 1/1966 | Griffiths........................ | 117/126 GQ |
| 3,320,080 | 5/1967 | Mazzarella et al............ | 106/213 |

Primary Examiner—William D. Martin
Assistant Examiner—D. Cohen
Attorneys—Staelin and Overman and William P. Hickey ABSTRACT: A starch size composition for coating glass fibers at forming which has greatly improved drying properties. The composition includes a relatively narrow range of a noncross-linked cationic starch and an underivatized starch that is preferably high in amylose and a portion of the granules of which are incompletely burst.

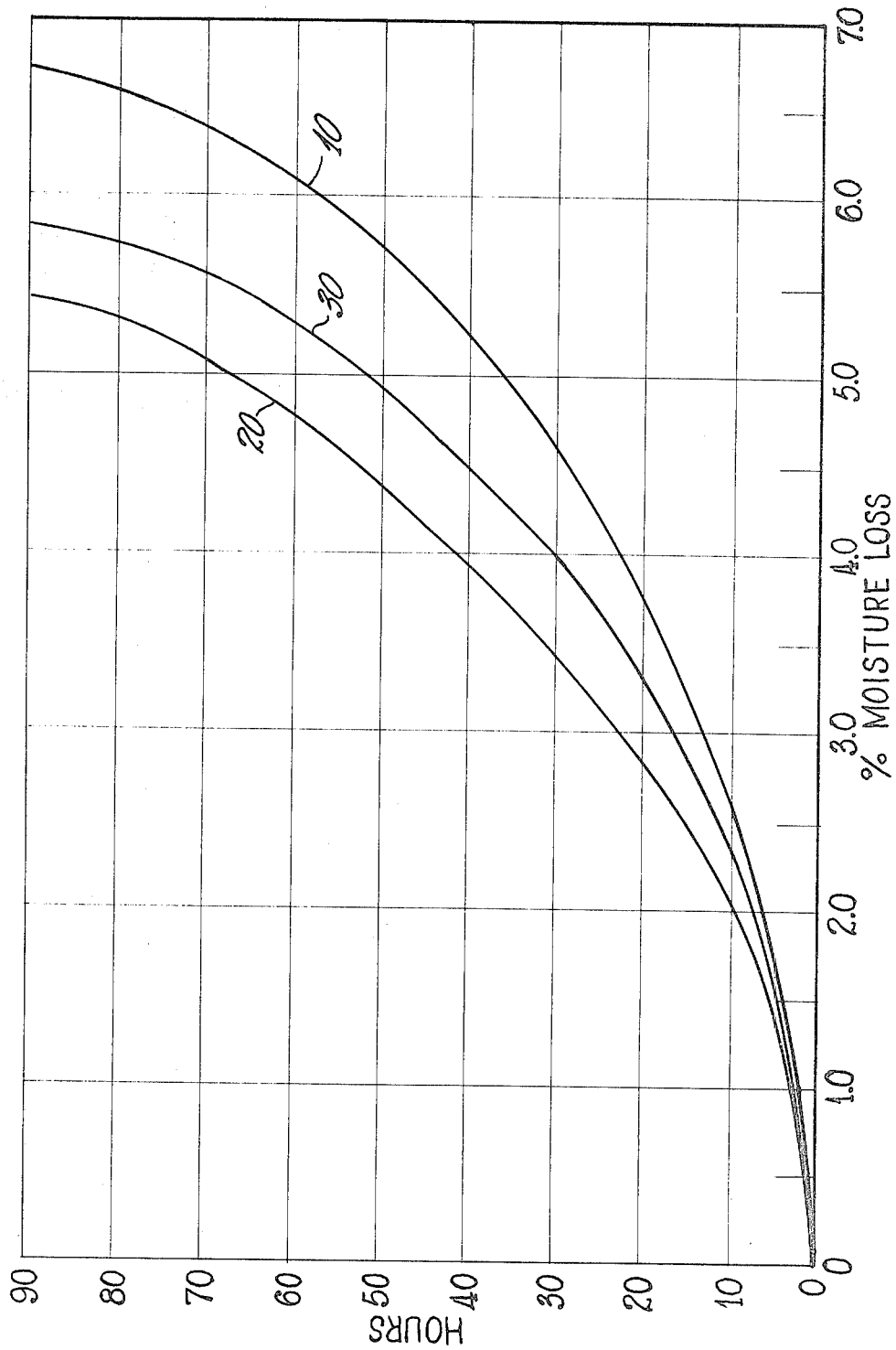

STARCH COATED FIBERS HAVING IMPROVED DRYING CHARACTERISTICS

CROSS REFERENCE TO RELATED APPLICATIONS

The present application is a Continuation-In-Part of my copending application Ser. No. 610,488, filed Jan. 20, 1967 and now abandoned.

BACKGROUND OF THE INVENTION

The present invention relates to starch lubricants for fibers; and more particularly to starch lubricants that are applied to glass fibers at forming to protect them from abrasion through subsequent gathering, twisting, quilling, beaming and weaving operations.

Starch lubricants of the type referred to are applied to glass fibers immediately after attenuation and before being drawn together into a strand. Thereafter the strand is wound at high speed into a coiled package about a tubular form and this package is allowed to dry before the fibers are uncoiled and used in the subsequent twisting, beaming, quilling and weaving operations. During the drying of the coiled package, water migrates from the center of the package to its exposed surfaces; and during this migration, a certain amount of coating materials, particularly starch and cationic lubricants, are carried with the water to produce a higher concentration of these materials at the exposed surface of the package than remain at the center of the package.

Solubilized amylose produces a gelable material which can be made to gel before being wound into the package, and this material has certain desirable properties, one of which is that it is fast drying. Amylose is the linear fraction of starch which is found in nature. Amylose is solubilized by solvating the primary and secondary OH groups in the starch molecule. Upon being cooled, some hydrogen bonding takes place through a plurality of water molecules which connect the OH groups to produce a gel. It is a property of amylose that a driving force exists during drying to throw off some of these water molecules of the gel until only one, or perhaps two, water molecules remain in the bond between the OH groups of adjoining molecular chains.

It has been known heretofore to incorporate cationic lubricants and nonionic lubricants into starch materials, including high amylose starch materials, in order to supplement the lubricating effect of the starch, particularly during the forming operation. The cationic lubricants are very soluble in water and these lubricants appear to migrate to a great extent with the water. Cationic lubricants, therefore while capable of hydrogen bonding with the starch are thrown off to a large extent during gelling and drying to become largely separated from the starch and thereby produce lubricating effects attributable to the materials themselves, rather than to a modification of the starch.

According to the present invention, it has been discovered that a relatively narrow range of noncrosslinked cationic starch containing ammonium and phosphonium radicals can be incorporated with a gelling nonderivatized high amylose starch to give better drying properties, while also giving as good migration resistance as the underivatized starch. The prior art has not taught that such modification is possible.

According to the invention, a natural occurring starch fraction, preferably high in amylose, is modified so that the starch molecule is made cationic, and this material is mixed with other naturally occurring starch materials. It has been found that naturally occurring starch materials can be made cationic by attaching a nitrogen or phosphorus atom having an unshared pair of electrons thereon to the starch molecule. Thereafter, a Bronstead-Lowry acid or a Lewis acid is reacted therewith to produce a cationic starch molecule. It will be understood that the material attached to the original unshared pair of electrons, need not be a proton but can be any group having a positive unbalance.

It has been found that such cationic starch materials when added to other starch materials do not become separated from the starch materials as do cationic lubricants. It appears that the cationic starch molecules become hydrogen bonded to naturally occurring starch molecules during gel formation through a multiplicity of water molecules, and that they dry to a stable form wherein they are bonded to another starch molecule through no more than one or two water molecules. The cationic starch materials therefore throw off water in substantially the same manner as the naturally occuring starch materials, and are in themselves compatible with the naturally occurring starch materials; so that there is very little force tending to withdraw the cationic starch from a water chain upon drying. The cationic starch material, therefore, remains in place to decrease hydrogen bonding between the chains of naturally occurring starch material, to not only modify the gelling characteristics of the mixture and speed up drying, but to permanently modify the characteristics of the dried film.

An object of the present invention is the provision of a new and improved starch lubricant which is fast drying and which does not produce streaks in woven fabrics during burn-off.

A more particular object of the present invention is the provision of a new and improved starch material which will gel, but whose tendency to form globules in fiber coating apparatus is greatly reduced, and which will dry more quickly than the prior art high amylose materials.

Further objects and advantages of the present invention will become apparent to those skilled in the art to which the invention relates from the following description of several preferred compositions which embody the invention, as well as the accompanying teaching of the principles by which the improved properties are achieved.

BRIEF DESCRIPTION OF THE DRAWING

The sole figure of the drawing is a graph of the percent of moisture that is lost at various drying times from coiled packages of glass fibers, the fibers of which are sized with various starch based coating materials.

DESCRIPTION OF THE PREFERRED EMBODIMENTS

It has been found that such a mixture of a noncrosslinked cationic starch and a naturally occurring starch of the gelling type, will form a modified type of gel that is softer and does not separate into globules during its application to the fibers. It has further been found that when the cationic starch derivative constitutes no more than approximately one third of the solubilized material, the mixture will throw off water faster than does the unmodified starch material when forming a gel by itself without impairing the migration and other properties of the composite film.

It will be apparent that while the cationic starch material can bond with amylopectin in the same manner as it does with amylose to modify the amylopectin characteristics, the modification of the amylose and its gel forming characteristics has particular advantages making this class of materials the preferred materials.

It has been found that when a noncrosslinked cationic starch material comprises as low as 4 percent of the gelled and/or solubilized starch material, a noticeable reduction in the number of streaks occurs in the finished woven fabrics. This streak reduction is evident at all percentage ranges up through those wherein the cationic starch derivative comprises 50 percent of the total gelled and/or solubilized starch. In some instances, it is desirable to incorporate incompletely burst starch granules dispersed throughout the gelled and/or solubilized starch; and when such materials are used, it has been found that the amount of starch rub-off during subsequent twisting and quilling operations is noticeably reduced up through concentrations wherein the cationic starch derivative comprises more than 33 percent of the gelled and/or solubilized starch. A mixture having improved overall properties is provided when the cationic starch derivative comprises from approximately 4 percent to approximately 33 percent by weight of the gelled and/or solubilized starch of the mixture.

The more preferred compositions appear to be formed when the cationic starch derivative comprises from between approximately 4 percent to 15 percent of the total gelled and/or solubilized starch.

EXAMPLE 1

A preferred starch lubricant material has the following composition in percentage by weight:

| | | |
|---|---|---|
| High Amylose Starch (50–60% amylose—50–40% amylopectin) | 3.82% | |
| Cationic Starch* | 0.42 | |
| Nonionic Lubricant (hydrogenated vegetable oil) | 1.27% | |
| Emulsifier (polyoxyethylene sorbitan monooleate) | 0.13% | |
| Other emulsifier (polyethylene glycol) | 0.13% | |
| Wetting agent (alkylphenoxypoly (ethyleneoxy) ethanol) | 0.03% | |
| Cationic Lubricant (tetraethylene pentamine distearate) | 0.21% | |
| Fungicide (tributyl tin oxide) | 10 p.p.m. | |
| Water | Balance | |

*A starch having one b-diethyl amine ethyl chloride hydrochloride group per glucose unit.

A mixture of solubilized and unsolubilized materials is formed by passing a water suspension of a mixture of the natural occurring starch and the cationic starch through a jet cooker whose exit temperature is controlled to a temperature of 210° F. ±2° F.

Saturated steam at approximately 100 p.s.i. is throttled to the jet cooker to provide this exit temperature, and this exit temperature provides a degree of partial cook which corresponds to that produced by the same materials when heated together in a pressure vessel at 254° F. The cationic lubricant and the polyethylene glycol are thoroughly mixed and heated to a temperature of approximately 170° F. and in approximately 1/20 of the total volume of water that is used, and this mixture is allowed to cool to 120° F. before being added to the starch cooked as above described. The vegetable oil, wetting agent and polyoxyethylene sorbitan monooleate are heated to 160° F. and 1/20 of the total volume of water is added to form an emulsion. This emulsion is blended into the above described mixture and the tributyl tin oxide is added. The balance of the water is blended into the mixture and the temperature of the mixture is reduced to between 140 to 150° F. for application to glass fibers immediately after attenuation and prior to being coiled into a package by a conventional padder or applicator.

Coiled packages of fibers produced as above described have the drying characteristics designated as example 1 in table 1 below. Table 1 compares the drying characteristics of the material of example 1 with those of packages of fibers prepared in an identical manner but having different ratios of the cationic starch material and the naturally occurring starch material.

Table II gives a comparison of still other properties of the same materials indicated in Table 1. The following is a listing of the meaning of the properties listed in Table II:

Ringer—indicates the percent of forming packages in which broken filaments gather into a ring as the strands are drawn off of the forming packages.

Rub-off—is the amount of starch material in unit weight/unit time that is lost in the form of powder when the coated strands are pulled over a contact point.

Fly—indicates the unit weight/unit time of short broken filaments which are lost when the coated strand is pulled over a contact point.

Migration Index—indicates the ratio of the weight of coating on the fibers on the outside of the package divided by the weight of coating on the fibers at the center of the package.

Streaks—grading system from 0.0–4.0 resulting from visual observation of streaks on partially heat cleaned yarn and/or fabric. Absence of streaks being graded 0.0.

Examples 2, 3 and 4 of Table I above give the corresponding results for mixtures prepared in the same manner as Example 1, but differing only in the percent of the unmodified starch and of the cationic starch. The percentage of these materials for each example is given in the table.

As indicated above, the mixtures of materials in water that was applied to the fibers in the above tests comprise approximately 5 percent with the balance being water. The high amylose material containing 50 to 60 percent amylose, 40 to 50 percent amylopectin when cooked at the temperatures indicated above provides approximately 75 percent of incompletely burst starch granules some of which are partially broken to give soft husks and the balance of which are swollen but unburst. It is assumed that the starch from the burst granules which went into solution did so with the same amylose to amylopectin ratio as occurred in the unburst starch granules, so that the composition of the mixture comprised: approximately 0.95 percent completely burst starch granules, 2.85 percent incompletely burst starch granules, and 0.52 percent of the cationic starch. In the above compositions, therefore, the incompletely burst starch granules comprises approximately 2.0 parts per part of solubilized starch, and the cationic starch comprised approximately 0.306 part per part of solubilized starch. It will be apparent that the incompletely burst starch granules do not produce migration or streaks, and that the incompletely burst starch granules add their physical properties to the mixture. These effects become important in the operations after forming as well as controlling migration during forming, and the incompletely burst starch granules should preferably be present in an amount of approximately 1.0 to 20.0 parts per part of the solubilized naturally occurring starch.

TABLE I

[Forming tube drying rate (percent total moisture lost in X hours)]

| Examples | Unmodified starch, percent | Cationic starch, percent | Hours after forming | | | | | |
|---|---|---|---|---|---|---|---|---|
| | | | 4 | 8 | 12 | 16 | 20 | 24 |
| 4 | 100 | 0.0 | 14.7 | 18.6 | 22.2 | 24.6 | 28.6 | 30.6 |
| 1 | 90 | 10.0 | 16.4 | 21.1 | 24.0 | 23.5 | 28.1 | 29.8 |
| 2 | 85 | 15.0 | 14.7 | 17.0 | 17.0 | 22.9 | 25.3 | 25.9 |
| 3 | 80 | 20.0 | 11.2 | 14.4 | 16.6 | 19.5 | 21.4 | 22.9 |

TABLE II

| Examples | Unmodified starch, percent | Cationic starch percent | Ringers | Rub off | Fly | Static | Streaks | Migration index |
|---|---|---|---|---|---|---|---|---|
| 4 | 100 | 0 | 45 | 66.6×10−4 | 7.8×10−4 | −2.6 | 2.0 | 1.48 |
| 1 | 90 | 10 | 46 | 49.6×10−4 | 6.5×10−4 | −1.8 | 1.8 | 1.56 |
| 2 | 85 | 15 | 29 | 48.9×10−4 | 10.3×10−4 | −1.6 | 1.8 | 1.57 |
| 3 | 80 | 20 | 38 | 36.8×10−4 | 7.9×10−4 | −1.7 | 1.5 | 1.44 |

The amount of the coating material which is applied to the fibers will, of course, effect the thickness of the coating which is applied to the fibers before drying as well as the amount which is left on the fibers after drying. The percent of solids which is used in the water mixture as well as the type of starch used controls the viscosity of the water mixture. In those instances where the starch material is principally amylopectin, a higher amount of naturally occurring starch solids can be used, and with high amylopectin starches the material which forms the completely cooked starch solution can range from approximately 5 to approximately 12 percent by weight. Where high amylose materials i.e. those containing more than approximately 40 percent amylose are used to form the gel, it is necessary in most instances to limit the amount of starch which is gelled to between approximately 2 percent and 6 percent by weight of the water mixture.

EXAMPLE 5

A forming size was prepared in the same manner given in example 1 using the same proportions excepting that a cationic starch having a single 2-chloroethyltributylphosphonium chloride group per glucose unit, was substituted for the cationic starch of example 1. The phosphonium material gave substantially the same improvement in properties as did the ammonium type cationic starch of example 1.

The ability of most materials to burn is decreased when nitrogen and/or phosphorus atoms are attached to the compounds. In the present instance, however, the rate of burn-off is increased when the ammonium and phosphonium groups are attached to the starch molecule.

EXAMPLE 6

A 5 percent solution of the cationic starch of example 1 was made by dissolving in water at a temperature of approximately 190° F. This material was coated on previously weighed glass slides and allowed to dry over night at a temperature of 140° F. Four coated glass slides were then weighed and placed in an oven containing air heated to 600° F. One slide was removed after an exposure of 5 minutes, another at 10 minutes, another at 15 minutes and another at 20 minutes. A black deposit existed on each of the slides, and the slides were weighed again. The percent of the coating which was burned off was computed and these results are given in table III under example 6. The same process was repeated excepting that the material of example 5 was substituted for the material of example 1. The percent of burn-off is also given in table III for this cationic starch.

The process was also repeated using the unmodified starch of examples 1, 2 and 3, and the rate of burn-off of the unmodified starch is given in table III.

TABLE III

Percent Burn-off At 600° F.

| Minutes | Natural Starch of Example 4 | Cationic Starch of Example 1 | Cationic Starch of Example 5 | Cato 75 Ammonium Derivatized Normal Corn Starch |
|---|---|---|---|---|
| 5 | 52.6 | 68.4 | 61.8 | 69.2 |
| 10 | 63.4 | 71.4 | 74.3 | 74.3 |
| 15 | 68.7 | 71.5 | 83.0 | 75.0 |
| 20 | 71.8 | 71.4 | 95.4 | 78.2 |

EXAMPLE 7

The forming size of example 1 was applied to 408 glass fibers having a diameter of 0.00035 inch at forming prior to being drawn into a strand. The strand was then coiled into a package which was placed in a room having a relative humidity of 50 percent for drying, and the package was weighed after 3, 7, 19, 27, 46, 53 and 91 hours. The loss in weight was then plotted to give the curve 10 of the drawing, and is tabulated in table IV.

EXAMPLE 8

A forming size was made according to example 1 of the Griffiths Pat. No. 3,227,192 using the following materials in parts by weight:

| Ingredients | Amount |
|---|---|
| Amylon Special 55 (55% amylose) | 300 |
| National HFS (corn starch cross-linked with phosphorus oxychloride and having 27 percent by weight amylose) | 300 |
| Pureco Oil (hydrogenated cottonseed oil) | 135 |
| Tween 81 (ethylene oxide derivative of a sorbitol ester) | 30 |
| Cation X (alkyl imidazoline reaction product of tetraethylene pentamine and stearic acid) | 60 |
| Carbowax 33 (polyethylene glycol having a molecular weight of approximately 300) | 72 |
| Igepal CA-630 (octyl phenoxy poly—(ethyleneoxy) ethanol—wetting agent) | 0.04 |
| Water to give a solids content of 6% by weight | |

A size was prepared by mixing the Amylon Special 55 starch and the National HFS starch in approximately one half of the total water, and cooking this slurry at 198° to 209° F. in a jet cooker for a sufficient period of time to thoroughly incorporate the starch into the aqueous system. Thereafter the carbowax 300, the Cation X, the Tween 81, and an emulsion of the Pureco oil were added and mixed thoroughly. This size was then applied to glass fibers using the procedure of example 7 and dried also according to the procedure given in example 7. The moisture loss is shown by curve 20 of the drawing.

EXAMPLE 9

The procedure of example 8 repeated excepting that the size composition was prepared using 454 parts of Amylon Special 55 starch to 60 parts of the National HFS starch. The drying curve for this size is given by the curve designated 30 in the drawing.

TABLE IV

[Percent moisture lost after time indicated]

| Curve | Hours at room temperature | | | | | | | 2 hrs. at 250° F. |
|---|---|---|---|---|---|---|---|---|
| | 1 | 3 | 7 | 19 | 27 | 46 | 53 | 91 | |
| 10 | .69 | 1.14 | 2.16 | 3.62 | 4.39 | 5.44 | 5.73 | 6.75 | 9.00 |
| 20 | .60 | 1.01 | 1.79 | 2.79 | 3.44 | 4.22 | 4.49 | 5.49 | 8.98 |
| 30 | .68 | 1.09 | 2.00 | 3.21 | 3.83 | 4.81 | 5.07 | 6.11 | 9.23 |

It has been found that partially burst or swollen but unburst granules of a high amylose starch have gelling properties even though they are not completely dispersed or solubilized. It has further been found that these unburst granules are bigger than the space between the fibers of a strand and, therefore, cannot migrate. It has also been found that a concentration of the cationic starch about these unburst granules aids in the removal of water from the granules so that a higher percentage of cationic starch in the solubilized starch around the granules is desirable than would be acceptable if the gel did not include unburst granules. There is, therefore, an averaging effect, and it appears that improved drying properties are achieved when the cationic starch is present in an amount of from approximately 4 to approximately 15 percent (most preferably 10 percent) of the gelled starch material, whether it is completely burst or not. Improved overall properties are achieved when a high percentage of the high amylose starch is present as unburst starch granules. The preferred materials, therefore, will comprise unburst starch granules in an amount of from approximately 50 to approximately 90 percent of the total starch material, desirably from approximately 60 percent to approximately 80 percent, and most desirably approximately 67 percent. Sixty-seven percent unburst starch granules is achieved when a starch composition comprising 90 percent high amylose and 10 percent cationic starch is cooked to burst approximately 25 percent of the high amylose granules. A complete size formulation will also include an emulsion of a nonionic lubricant of from approximately 5 percent to approximately 50 percent of the total starch material (preferably from 10 to 30 percent), and a cationic lubricant of up to approximately 10 percent (preferably 2 percent to 5 percent) of the total starch material.

Preferred size formulations, therefore, will comprise the following ingredients in approximate percentages by weight:

| Ingredients | Percent By Weight |
| --- | --- |
| High amylose starch | 2 to 6% |
| Cationic Starch | 0.2 to 1.0% |
| Nonionic Lubricant | 0.10 to 3.0% |
| Emulsifier | 0.020 to 0.50% |
| Wetting Agent | 0.0 to 0.20% |
| Cationic Lubricant | 0.05 to 1.0% |
| Water | Balance |

It will be apparent that the objects heretofore enumerated as well as others have been accomplished, and that there has been provided a new and improved starch containing lubricant for fibers which will dry quickly when on fibers in a coiled package to produce low streak levels in finished fabrics and to further produce certain desirable gelling characteristics when incorporated in high amylose starch solutions.

While the invention has been described in considerable detail, I do not wish to be limited to the particular compositions described in detail; and it is my intention to cover hereby all novel adaptations of the principles disclosed, as well as modifications of these principles which will come within the practice of those skilled in the art to which the invention relates, and which are covered by the appended claims.

I claim:

1. In the method of forming glass fibers comprising the steps of: drawing glass filaments from a molten supply of glass at a high rate of speed; gathering the filaments and combining them into a strand; applying a fast drying sizing composition having unburst starch granules to the filaments as they are being drawn, said size consisting essentially of an aqueous material having from approximately 2 to approximately 12 percent by weight of a gelling starch material winding the sized strand on a rapidly rotating forming tube; and conditioning the strand on the forming tube to reduce the moisture content to an amount which is acceptable for twisting the strand into yarn; the improvement which comprises: employing as the size a composition comprising: an incompletely burst starch granule portion of from approximately 50 percent to approximately 90 percent of the total starch, and a cationic starch portion from the group consisting of noncrosslinked Nitrogen and Phosphorus starch ethers and esters of from approximately 4 percent to approximately 15 percent by weight of the total starch.

2. The method of claim 1 wherein the starch material comprises from 2 to 6 percent by weight of the size of a starch having an amylose to amylopectin ratio of more than 40 percent by weight.

3. The method of claim 1 wherein the cationic starch is made cationic by an ammonium radical.

4. The method of claim 1 wherein the cationic starch is made cationic by a phosphonium radical.

5. In the method of forming glass fibers which comprises the steps of: drawing glass filaments from a molten supply of glass at a high rate of speed; gathering the filaments and combining them into a strand; applying a fast drying sizing composition having unburst starch granules to the filaments as they are being drawn, said size consisting essentially of an aqueous material having from 2 to 12 percent by weight of a starch mixture; winding the sized strand on a rapidly rotating forming tube; and conditioning the strand on the forming tube to reduce the moisture content to an amount which is acceptable for twisting the strand into yarn; the improvement which comprises employing as the size a composition comprising: an incompletely burst starch granule portion of from approximately 60 percent to approximately 80 percent of the total starch, and a cationic starch portion from the group consisting of noncrosslinked Nitrogen and Phosphorus starch ethers and esters of from approximately 4 percent to approximately 15 percent by weight of the total starch; 5 to 50 percent by weight of a nonionic lubricant based upon the weight of starch mixture, and up to 10 percent by weight of a cationic lubricant based upon the weight of starch mixture.

6. In the method of forming a glass fiber fabric which comprises the steps of: drawing glass filaments from a molten supply of glass at a high rate of speed; gathering the filaments and combining them into a strand; applying an aqueous sizing composition to the filaments as they are being drawn; winding the sized strand on a rapidly rotating forming tube; conditioning the strand wound on the forming tube to reduce the moisture content of the sizing composition to an amount which is acceptable for twisting the strand into yarn; weaving the yarn into a cloth; heating the cloth to remove the sizing composition and set the fibers; the improvement which comprises: applying a fast drying aqueous composition consisting essentially of: from 2 to 12 percent by weight of a starch mixture having an incompletely burst starch granule portion of from approximately 50 percent to approximately 90 percent of the total starch, and a cationic starch portion from the group consisting of noncrosslinked Nitrogen and Phosphorus starch ethers and esters of from approximately 4 percent to approximately 15 percent by weight of the total starch; 5 to 50 percent by weight of a nonionic lubricant based upon the weight of starch mixture; and up to 10 percent by weight of a cationic lubricant based upon the weight of starch mixture.

7. A sized woven glass fabric comprising glass fibers sized with a fast drying, aqueous size composition which is readily removed by subsequently heating the sized woven fabric at a temperature effecting thermo destruction of the sizing composition and volatilizing the organic components thereof, said sizing composition prior to heating consisting essentially of the dry residue of an aqueous composition consisting essentially of: from 2 to 12 percent by weight of a starch mixture having an incompletely burst starch granule portion of from approximately 60 percent to approximately 80 percent of the total starch, and a cationic starch portion from the group consisting of noncrosslinked Nitrogen and Phosphorus starch ethers and esters of from approximately 4 percent to approximately 15 percent by weight of the total starch; 5 to 50 percent by weight of a nonionic lubricant based upon the weight of starch mixture; and up to 10 percent by weight based upon the weight of starch mixture of a cationic lubricant.

8. In the method of forming glass fibers which comprises the steps of: drawing glass filaments from a molten supply of glass at a high rate of speed; gathering the filaments and combining them into a strand; applying a fast drying size composition to the fibers as they are being drawn; winding the sized strand on a rapidly rotating forming tube; and conditioning the strand in the forming tube to reduce the moisture content to an amount which is acceptable for twisting the strand into a yarn; the improvement which comprises: employing as the size a composition consisting essentially of the following in approximate percentages

| | |
| --- | --- |
| Incompletely burst granules of high amylose starch | 2 to 6% |
| Cationic Starch | 0.2 to 1.0% |
| Nonionic lubricant | 0.10 to 3.0% |
| Emulsifier | 0.020 to 0.50% |
| Wetting agent | 0.0 to 0.26% |

| | |
|---|---|
| Cationic lubricant | 0.005 to 1.0% |
| Water | Balance. |

9. In the method of forming glass fibers which comprises the steps of: drawing glass filaments from a molten supply of glass at a high rate of speed; gathering the filaments and combining them into a strand; applying a fast drying size composition to the fibers as they are being drawn winding the sized strand on a rapidly rotating forming tube; and conditioning the strand in the forming tube to reduce the moisture content to an amount which is acceptable for twisting the strand into a yarn; the improvement which comprises: employing as the size a composition consisting essentially of the following in approximate percentages by weight

| | |
|---|---|
| Incompletely burst granules of high amylose starch | |
| Cationic starch | 3.82 |
| Nonionic lubricant | 0.42 |
| emulsifier | 1.27 |
| Wetting agent | 0.26 |
| Cationic lubricant | 0.03 |
| Water | 0.21 |
| | Balance. |